US008025447B2

(12) United States Patent
Hwang et al.

(10) Patent No.: US 8,025,447 B2
(45) Date of Patent: Sep. 27, 2011

(54) APPARATUS FOR REDUCING MIRROR BOUNCE, PHOTOGRAPHING APPARATUS COMPRISING THE SAME, AND PHOTOGRAPHING METHOD FOR THE SAME

(75) Inventors: Seung-hyun Hwang, Suwon-si (KR); Myung-kyu Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 12/512,466

(22) Filed: Jul. 30, 2009

(65) Prior Publication Data
US 2010/0027091 A1  Feb. 4, 2010

(30) Foreign Application Priority Data
Jul. 31, 2008  (KR) .................. 10-2008-0075329

(51) Int. Cl.
*G03B 19/12*  (2006.01)

(52) U.S. Cl. ....................................... 396/358; 359/872
(58) Field of Classification Search .................. 396/358, 396/447; 348/335; 359/838, 846, 848, 849, 359/872
See application file for complete search history.

(56) References Cited

U.S. PATENT DOCUMENTS
5,768,644 A * 6/1998 Tanabe .......................... 396/358
* cited by examiner

*Primary Examiner* — Clayton E Laballe
*Assistant Examiner* — Autumn Parker
(74) *Attorney, Agent, or Firm* — Drinker Biddle & Reath LLP

(57) ABSTRACT

Provided are an image processing device, the operating speed of which is increased by reducing mirror bounce, a photographing apparatus having the same, and a photographing method. The image processing device includes a mirror disposed to revolve with respect to a shaft, a first guide unit disposed in a path of revolution of the mirror to lessen vibration of the mirror when the mirror revolves, and a first elastic unit applying predetermined elastic force onto the first guide unit while being engaged with the first guide unit.

19 Claims, 8 Drawing Sheets

APPARATUS FOR REDUCING MIRROR BOUNCE, PHOTOGRAPHING APPARATUS COMPRISING THE SAME, AND PHOTOGRAPHING METHOD FOR THE SAME

CROSS-REFERENCE TO RELATED PATENT APPLICATION

This application claims the benefit of Korean Patent Application No. 10-2008-0075329, filed on Jul. 31, 2008, in the Korean Intellectual Property Office, the entire contents of which is incorporated herein by reference.

BACKGROUND OF THE INVENTION

1. Field of the Invention

The present invention relates to an image processing device, a photographing device having the same, and a photographing method, and more particularly, to an image processing device, the operating speed of which is increased by reducing mirror bounce, a photographing apparatus having the same, and a photographing method.

2. Description of the Related Art

It is now easier for novice photographers to take photographs like professional photographers due to digital single lens reflex (DSLR) cameras, which are single lens reflex cameras that take digital photographs.

A conventional DSLR camera is fabricated having a mirror which is installed to revolve within a predetermined angular range on an optical axis of a lens with respect to a shaft. At ordinary times, light of a subject, which is transmitted by a lens unit, is reflected from the mirror and imaged on a focus plate, so that a photographer can view the image of the subject, which is to be imaged on the focus plate, through the use of a pentaprism and a viewfinder. In this case, if a shutter-release signal is input, the mirror moves upward in order to retreat from the optical axis of the lens unit while revolving within the predetermined angular range about the shaft. When a shutter is driven to be open under the control of a shutter driving circuit, the image of the subject is formed on an imaging device.

In such a DSLR camera, while the mirror that moves upward during photographing, moves downward to return to the original position after the photographing, the mirror bounces upward due to the descending force thereof, thereby causing vibration of the mirror to a certain degree. For next photographing, the mirror needs to be stable without vibrating since operations for next photographing, such as auto focusing (AF), can be performed only when the mirror is stable. Thus, the amount of time needed for the mirror to stabilize is closely related to the operating speed of the camera. In particular, it is very important to reduce such mirror bounce for continuous photographing.

SUMMARY OF THE INVENTION

The present invention provides a digital single lens reflex (DSLR) camera, the operating speed of which is increased by reducing mirror bounce.

According to an aspect of the present invention, there is provided an image processing apparatus including a mirror installed to revolve with respect to a shaft; a first guide unit disposed in a path of revolution of the mirror to lessen vibration of the mirror when the mirror revolves; and a first elastic unit applying predetermined elastic force onto the first guide unit while being engaged with the first guide unit The first elastic unit may apply the predetermined elastic force onto the first guide unit in one direction before pressure applied onto the first elastic unit reaches a predetermined threshold level, and apply the predetermined elastic force onto the first guide unit in a direction which is substantially opposite to the direction when the pressure applied surpasses the predetermined threshold level.

When the mirror revolves and one end of the mirror presses against the first guide unit, the first elastic unit may apply the predetermined elastic force on the first guide unit in order to allow the first guide unit to press against the mirror in a direction substantially opposite to a direction of the revolution of the mirror, before the pressure applied onto the first elastic unit reaches the predetermined threshold level.

When the mirror revolves and one end of the mirror pressurizes the first guide unit, the first elastic unit may apply the predetermined elastic force on the first guide unit in order to allow the first guide unit to press against the mirror in a direction of the revolution of the mirror, when the pressure applied onto the first elastic unit surpasses the predetermined threshold level.

The elastic unit may be a torsion spring.

When the mirror revolves and one end of the mirror presses against the first guide unit, the torsion spring may apply the predetermined elastic force on the first guide unit in order to allow the first guide unit to press against the mirror in a direction substantially opposite to a direction of the revolution of the mirror, before the pressure applied to the torsion spring before pressure applied onto the first elastic unit reaches a predetermined threshold level.

When the pressure applied to the torsion spring surpasses the predetermined threshold level while the mirror revolves and one end of the mirror presses against the first guide unit, the elastic force may act to separate both ends of the torsion spring from each other and thus the first guide unit may press against the mirror in a direction of revolution of the mirror.

The apparatus may further include a second guide unit disposed in the path of revolution of the mirror to lessen vibration of the mirror when the mirror revolves; and a second elastic unit applying predetermined elastic force on the second guide unit while being engaged with the second guide unit.

When the mirror revolves and one end of the mirror presses against the second guide unit, the second elastic unit may apply a predetermined elastic force on the second guide unit in order to allow the second guide unit to press against the mirror in a direction substantially opposite to the direction of revolution of the mirror.

The apparatus may further include a stopper preventing the second guide unit from excessively revolving.

The first guide unit and the second guide unit may substantially press against the mirror in opposite directions.

The first elastic unit and the second elastic unit may substantially apply forces onto the mirror in opposite directions in order to lessen vibration of the mirror when the mirror revolves.

The first guide unit may include a first projection formed such that the mirror is to be placed on the first projection; and a second projection formed to face the first projection in order to press against the mirror.

When the mirror revolves and one end of the mirror presses against the first projection, the first elastic unit may apply the predetermined elastic force on the first projection in order to allow the first projection to press against the mirror in a direction opposite to a direction of the revolution of the mirror, before the pressure applied onto the first elastic unit reaches the predetermined threshold level.

When the mirror revolves and one end of the mirror presses against the first projection, the first elastic unit applies the predetermined elastic force on the second projection in order to allow the second projection to press against the mirror in a direction of the revolution of the mirror, when the pressure applied onto the first elastic unit has surpassed the predetermined threshold level.

According to another aspect of the present invention, there is provided a photographing apparatus including a lens on which light is incident; an imaging device converting energy of the incident light into an electrical signal; a display unit displaying an image captured by the imaging device; a mirror changing a direction of propagation of the incident light; and an image processing device of one of claims 1 through 15, the image processing unit disposed in a path of revolution of the mirror and lessening vibration of the mirror when the mirror revolves.

According to another aspect of the present invention, there is provided a method of photographing an image by using an imaging apparatus having an image processing device, the method including (a) moving downward of a mirror while revolving in a first direction; (b) when the mirror contacts a first guide unit and pushes the first guide unit in the first direction, applying, via a first elastic unit, a predetermined elastic force onto the first guide unit in order to allow the first guide unit to push the mirror in a direction opposite to the first direction; and (c) when the first elastic unit elastically deforms to a predetermined threshold level, applying, via the first elastic unit, a predetermined elastic force onto the first guide unit in order to allow the first guide unit to push the mirror in the first direction.

The method may further include after (c), (d) when the mirror contacts a second guide unit and pushes the second guide unit in the first direction, applying, via the second elastic unit, a predetermined elastic force onto the second guide unit in order to allow the second guide unit to push the mirror in the direction opposite to the first direction.

The first guide unit and the second guide unit may press against the mirror in substantially opposite directions.

The first elastic unit and the second elastic unit may apply forces onto the mirror in substantially opposite directions in order to lessen vibration of the mirror when the mirror revolves.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of the present invention will now be described in detail with reference to the attached drawings.

Figure 1:
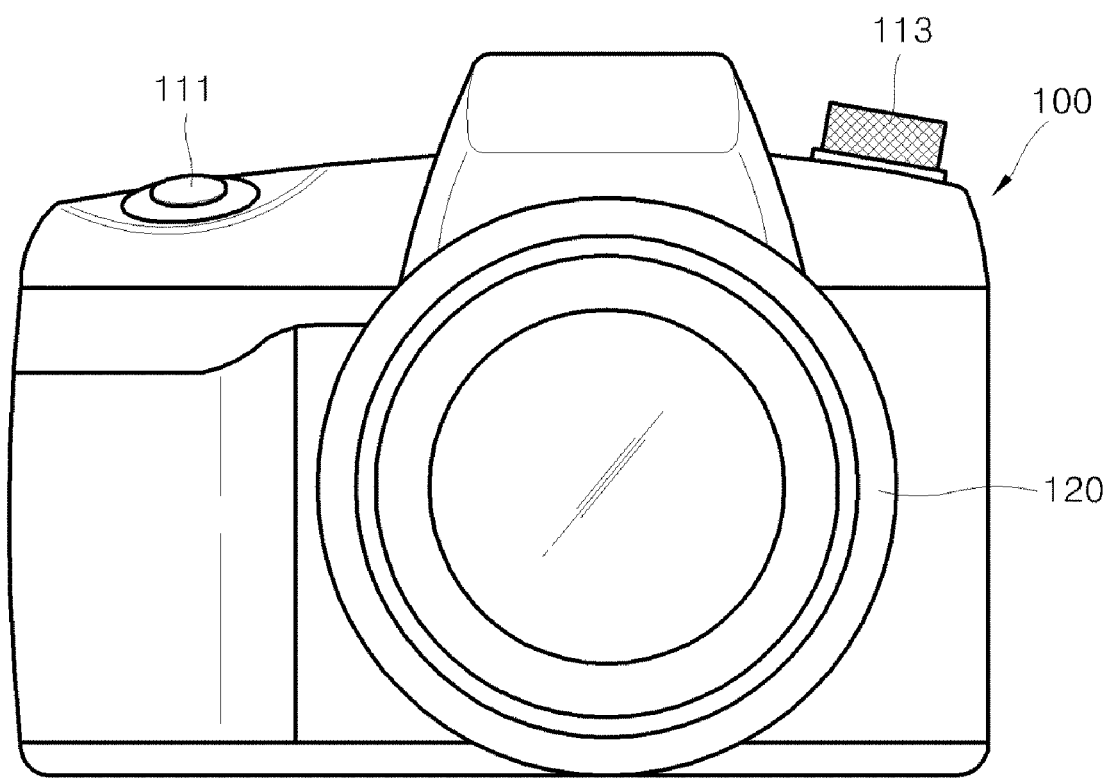
FIG. 1 is a front view of an example of a digital single lens reflex (DSLR) camera according to an embodiment of the present invention.

FIG. 1 is a front view of a an example of a digital single lens reflex (DSLR) camera 100 according to an embodiment of the present invention. Referring to FIG. 1, a shutter-release button 111, a mode dial 113, and a lens unit 120 are installed on a front side of the DSLR camera 100 of the present embodiment.

The shutter-release button 111 of the DSLR camera 100 opens and closes a shutter to allow for the exposing or covering of an image-obtaining element, e.g., a charge-coupled device (CCD) or a complementary metal oxide semiconductor (CMOS), to light for a predetermined time. The shutter-release button 111 also operates along with an aperture (not shown) to appropriately expose a subject so as to record an image of the subject in the image-obtaining element.

The shutter-release button 111 is used to generate first and second image photographing signals. If the first image photographing signal is generated when the shutter-release button 111 is in a half depressed state, the DSLR camera 100 controls focusing and an amount of light (exposure amount) on a focal point. If the focal point is completely adjusted and the amount of the light is completely controlled following the input of the first image photographing signal, the second image photographing signal which is generated when the shutter-release button 111 is fully depressed may be input to capture an image.

The mode dial 113 is pressed to select a photographing mode. The mode dial 113 of the DSLR camera 100 supports an auto (auto photographing) mode, a scene mode, an effect mode, an A/S/M mode, etc. The auto mode is used to minimize setup requirements of a user and rapidly and conveniently photograph an image according to the intension of the user. The scene mode is used to simply and optimally set a camera according to photographing conditions or conditions of a subject. The effect mode is used to give a special effect to image photographing, for example, effects such as continuous photographing, scene photographing, etc. The A/S/M mode is used to manually set various functions including the diameter of an aperture and a shutter speed to photograph an image. However, the present invention is not limited thereto.

The lens unit 120 receives light from an external light source to process the image.

Figure 2:
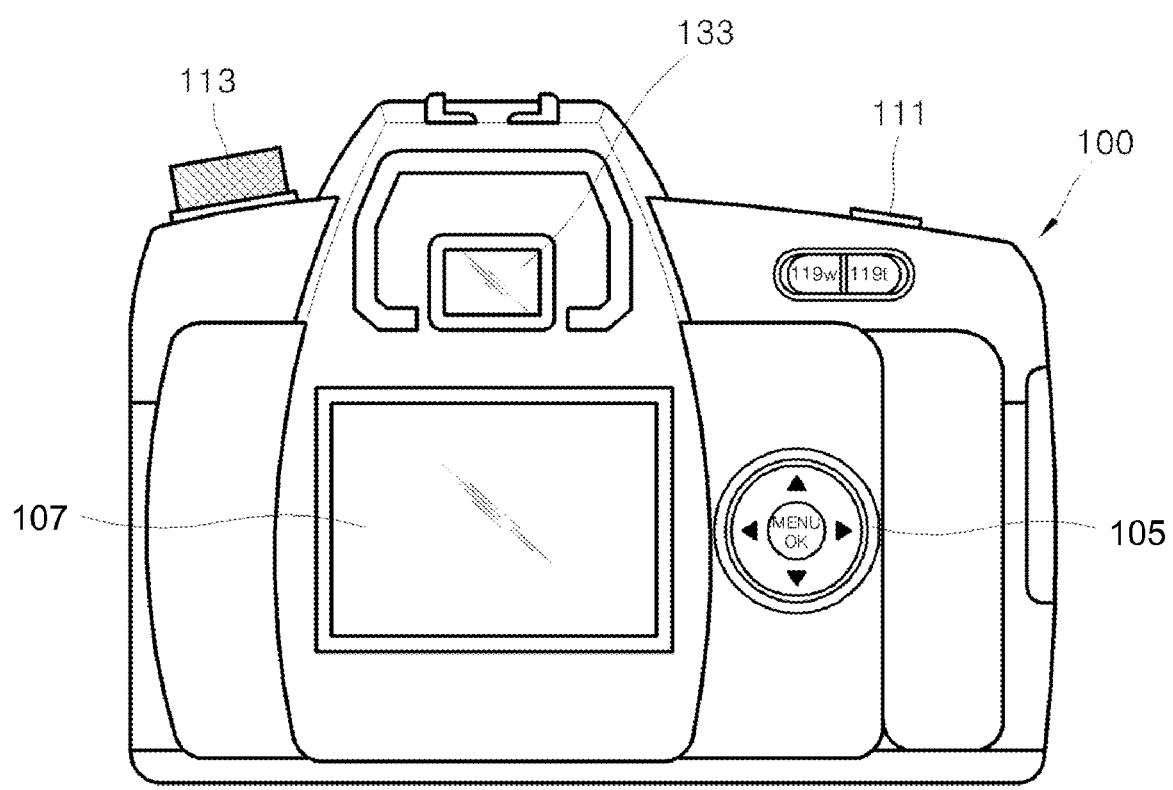
FIG. 2 is a rear view of the example of a DSLR camera of FIG. 1 according to an embodiment of the present invention.

FIG. 2 is a rear view of the DSLR camera 100 of FIG. 1. Referring to FIG. 2, a viewfinder 133, a wide angle-zoom button 119w, a telephoto-zoom button 119t, a function button 105, and a display unit 107 are installed on a rear side of the DSLR camera 100.

The viewfinder 133 of the DSLR camera 100 is a display screen through which a composition of a subject to be photographed can be viewed.

The wide angle-zoom button 119w and the telephoto-zoom button 119t are respectively pressed to widen or narrow a viewing angle, and may be pressed to change the size of a selected exposed area. When the wide angle zoom-button 119w is pressed, the size of the selected exposed area is increased. When the telephoto-zoom button 119t is pressed, the size of the selected exposed area is decreased.

The function button 105 includes up, down, left, right, and MENU/OK buttons, i.e., a total of five buttons. The function button 105 is pressed to navigate through various menus related to operations of the DSLR camera 100. The up, down, left, right, and MENU/OK buttons may be used as shortcut keys, and the functions of the function button 105 may vary according to manufacturers.

Figure 3:
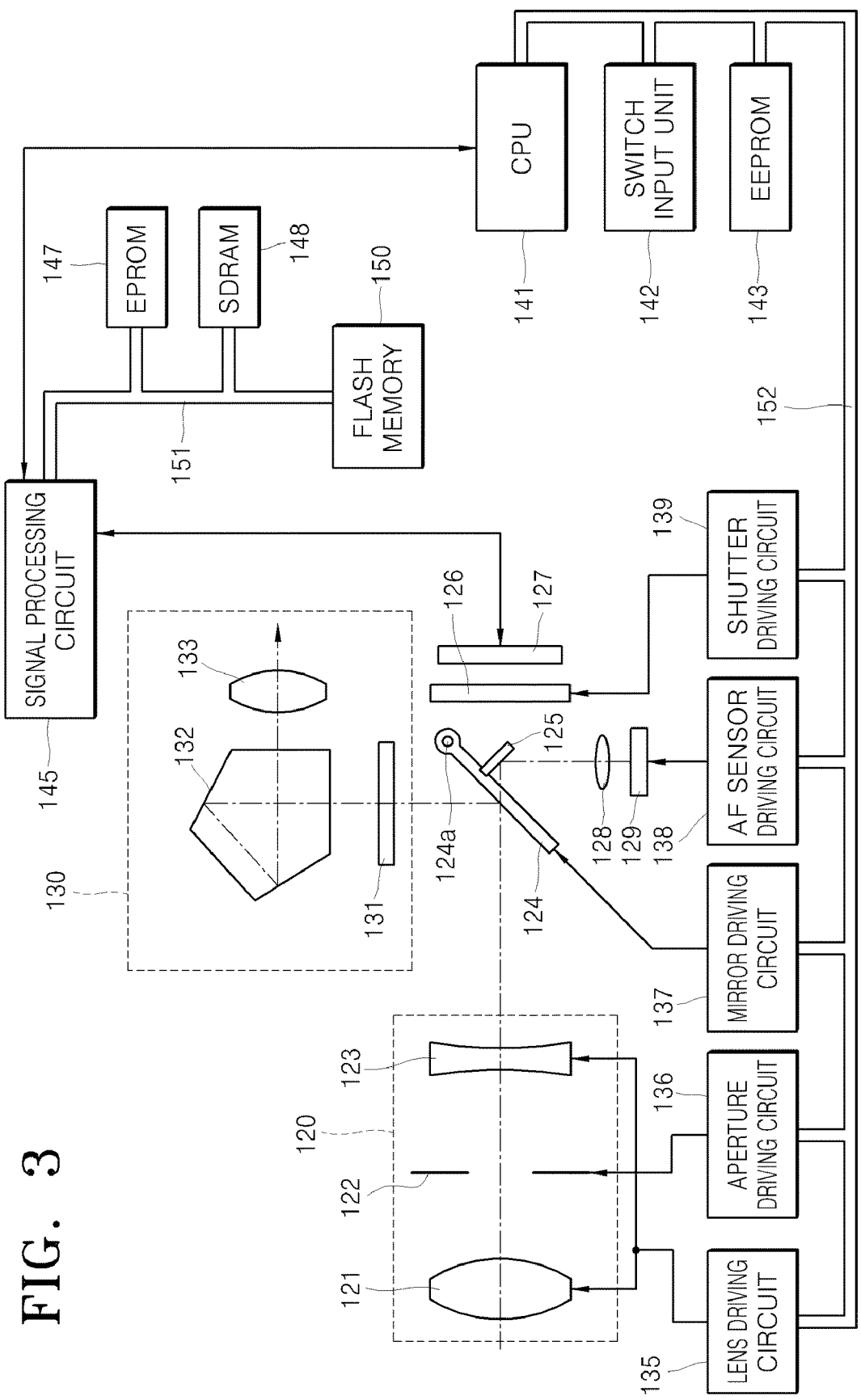
FIG. 3 is a block aperture of an example of a DSLR camera according to an embodiment of the present invention.

FIG. 3 is a block aperture of an example of a DSLR camera 100 according to an embodiment of the present invention. Referring to FIG. 3, the DSLR camera 100 includes a central processing unit (CPU) 141, and a plurality of elements, e.g., a lens unit 120, a shutter 126, an imaging device 127, and a finder optical system 130. The CPU 141 is a control unit that controls the overall operations of the DSLR camera 100, and the plurality of elements operate according to a control signal received from the CPU 141.

The lens unit 120 includes first and second lenses 121 and 123 and an aperture 122 that is disposed between the first and second lenses 121 and 123. Thus, the first and second lenses 121 and 123 of the lens unit 120 are driven by a lens driving circuit 135, and the aperture 122 is driven by an aperture driving circuit 136.

A mirror 124 is formed in the rear of the second lens 123, on an optical axis of the first and second lenses 121 and 123. A central portion of the mirror 124 is formed as a half mirror. The mirror 124 may revolve within a predetermined angular range with respect to a shaft 124a.

A sub mirror 125 is formed on a rear side of the mirror 124. A portion of light incident on the lens unit 120 penetrates the mirror 124 and then is reflected from the sub mirror 125. A separator optical system 128 is disposed on an axis of the light reflected from the sub mirror 125 so as to form the light into two images. An auto focus (AF) sensor 129 is disposed in an imaging position of a subject, which is formed by the separator optical system 128. The AF sensor 129 is connected to an AF sensor driving circuit 138.

The sub mirror 125, the separator optical system 128, and the AF sensor 129 constitute an apparatus for detecting a focus according to a well-known phase difference method. The AF sensor driving circuit 138 drives the AF sensor 129 under control of the CPU 141. That is, the CPU 141 calculates a defocus amount based on an image signal generated by the AF sensor 129, and controls the lens driving circuit 135 using the calculated defocus amount to drive the first and second lenses 121 and 123 of the lens unit 120 so as to adjust a focal point. Here, the lens driving circuit 135 includes a driving source, such as an electronic motor or an ultrasonic motor, a driver circuit for controlling the driving source, an encoder device for detecting a position of a lens.

The finder optical system 130 is disposed in a path of the light reflected from the mirror 124, and includes a focal plate 131, a pentaprism 132, the viewfinder 133, and a display device (not illustrated). Light of the subject, which is obtained from the first and second lenses 121 and 123 of the lens unit 120, is reflected from the mirror 124 and is then imaged on the focal plate 131. A photographer may check an image of a subject, which has been imaged on the focal plate 131, using the pentaprism 132 and the viewfinder 133.

The mirror 124 and the sub mirror 125 may revolve within a predetermined angular range with respect to the shaft 124a of the mirror 124 due to a mirror driving circuit 137 so as to retreat from the optical axis of the first and second lenses 121 and 123 of the lens unit 120. Also, the shutter 126 and the imaging device 127 are disposed to the rear of the mirror 124, on the optical axis of the lens unit 120.

The shutter 126 is driven to be open for a predetermined time under control of a shutter driving circuit 139 so that the imaging device 127 images the subject. That is, the mirror 124 is driven to move upward in order to retreat from the optical axis of the lens unit 120 under control of the mirror driving circuit 137 and thus in this state if the shutter 126 is open under control of the shutter driving circuit 139, the image of the subject is formed on the imaging device 127.

The lens driving circuit 135, the aperture driving circuit 136, the mirror driving circuit 137, the AF sensor driving circuit 138, and the shutter driving circuit 139 are connected to the CPU 141 having a micro-processor, via a data bus 152.

A switch input unit 142 and an electrically erasable programmable read-only memory (EEPROM) 143 which is a non-volatile memory are also connected to the CPU 141 via the data bus 152.

The switch input unit 142 includes first and second release switches, and a plurality of switches including power switches operating when a power button (not shown) is pressed. The first release switch is switched on in response to a first image photographing signal, which is generated when the shutter-release button 111 of the DSLR camera 100 of FIG. 1 is in a half depressed state. The second release switch is switched on in response to a second image photographing signal, which is generated when the shutter-release button 111 is in a fully depressed state. A manipulation signal generated through a manipulation of a switch installed on a side of the switch input unit 142 is supplied to the CPU 141.

When the first release switch is switched on, the CPU 141 drives the AF sensor driving circuit 138 to calculate the distance between the two images formed on the AF sensor 129. Also, the CPU 141 drives the lens driving circuit 135 based on data regarding the distance to adjust a focal point of light passing through the first and second lenses 121 and 123 of the lens unit 120.

When the second release switch is switched on, the CPU 141 drives the mirror driving circuit 137 to retract the mirror 124 from the optical axis of the lens unit 120, while calculating an appropriate cross-section contraction value and a shutter exposure time based on luminance information of the subject, which is based on an output of the AF sensor 129. In addition, the CPU 141 drives the aperture driving circuit 136 by using the appropriate cross-section contraction value in order to drive the aperture 122, and drives the shutter driving circuit 139 by using the shutter exposure time in order to drive the shutter 126.

When the image of the subject is formed on an imaging plane of the imaging device 127 according to the above-described operations, the image of the subject is converted into an analog image signal. Then, the analog image signal is converted into a digital image signal by a signal processing circuit 145.

The signal processing circuit 145 is connected to an erasable programmable read-only memory (EPROM) 147, a synchronous dynamic random access memory (SDRAM) 148, and a flash memory 150 via a data bus 151.

The EPROM 147 stores programs that are executed by a processor of the signal processing circuit 145. The SDRAM 148 temporarily stores image data generated before image processing or image data generated during image processing. The flash memory 150 is a non-volatile memory that stores finally determined image data. The SDRAM 148 is a volatile memory that temporarily stores information and operates at a high speed but if the supply of power to the SDRAM 148 is stopped, information stored in the SDRAM 148 is lost. The flash memory 150 is a non-volatile memory and operates at a low speed but even if the supply of power to the memory 150 is stopped, information stored in the flash memory 150 is preserved.

The structure of an image processing device of a DSLR camera according to an embodiment of the present invention will now be described in greater detail.

Figure 4:
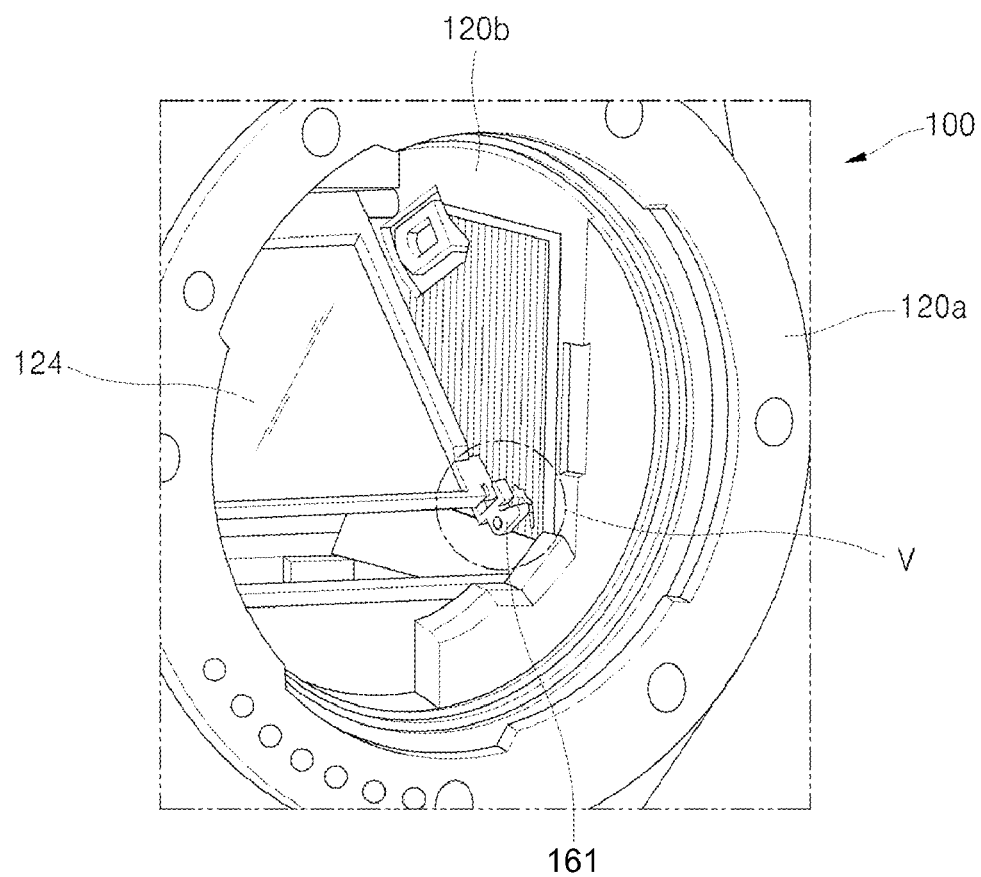
FIG. 4 is a perspective view of an example of an image processing device of the DSLR camera of FIG. 3 according to an embodiment of the present invention.
Figure 5:
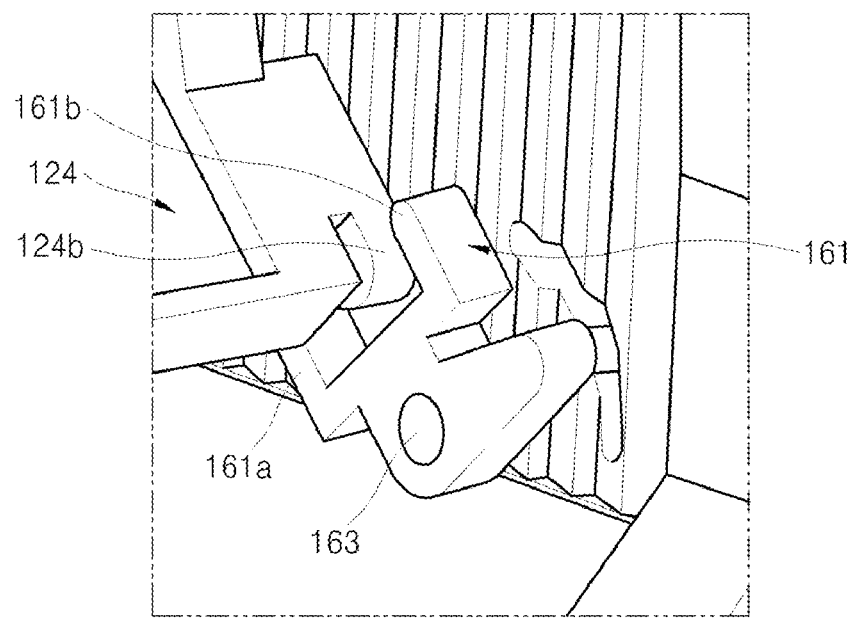
FIG. 5 is an enlarged view of the portion V of the example of the DSLR camera of FIG. 4.
Figure 6:
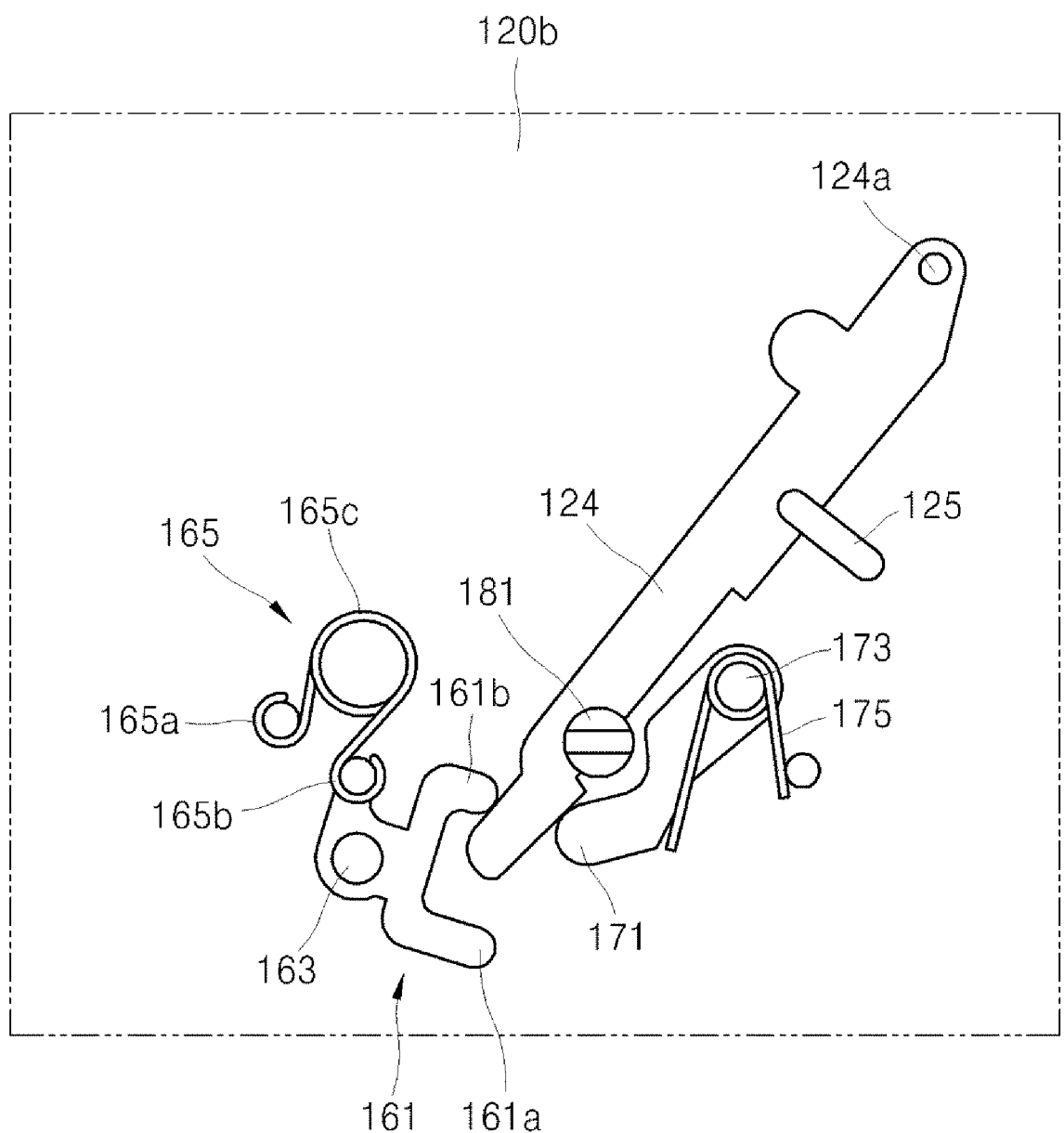
FIG. 6 is a side view of the example of an image processing device of the DSLR camera of FIG. 3.

FIG. 4 is a perspective front view of an example of an image processing device of the DSLR camera 100 illustrated in FIG. 3. FIG. 5 is an enlarged view of a portion V of the example of an image processing device of FIG. 4. FIG. 6 is a side view of the example of an image processing device of FIG. 4.

Referring to FIGS. 4 through 6, the image processing device includes a first guide unit 161, a first elastic unit 165, a second guide unit 171, a second elastic unit 175 and a stopper 181.

At a front side of the DSLR camera 100, a lens mount 120a, which the lens unit 120 (see FIG. 1) is attached to or detached from, is formed. A mirror box 120b is disposed inside the lens mount 120a and the mirror 124 is included in the mirror box 120b. That is, the mirror 124 is installed to the rear of the lens unit 120 on the optical axis of the lens unit 120, and a central part of the mirror 124 is formed of a semi transmissible mirror. The mirror 124 is installed to revolve within a predetermined angular range with respect to a shaft 124a. The first guide unit 161, the first elastic unit 165, the second guide unit 171, the second elastic unit 175, and the stopper 181 are disposed in the path of revolution of the mirror 124 in order to decrease vibration generated when the mirror 124 revolves.

More specifically, in the case of a conventional single lens reflex camera, while a mirror that moves upward during photographing, moves downward to return to the original position after the photographing, the mirror bounces upward due to the descending force thereof, thus causing vibration of the mirror to a certain degree. For a subsequent photographing operation, the mirror needs to be stable without vibrating since operations for photographing, such as auto focusing (AF), can be performed only when the mirror is stable. Thus, the amount of time needed for the mirror to stabilize is closely related to the operating speed of the camera. In particular, it is very important to reduce such mirror bounce for continuous photographing.

According to an embodiment of the present invention, two guide units supporting a mirror in opposite directions when the mirror moves downward and two elastic units applying predetermined elastic force onto the guide units, are further provided in order to increase the operating speed of a camera by reducing mirror bounce.

The first guide unit 161 is disposed in the path of revolution of the mirror 124 in order to reduce vibration of the mirror 124 when the mirror 124 revolves. In detail, referring to FIG. 5 enlarging the first guide unit 161, the first guide unit 161 is installed inside the DSLR camera 100 to revolve with respect to a first shaft 163. A first projection 161a and a second projection 161b protrude from one side surface of the first guide unit 161, thus approximately forming a "U" shape. The first projection 161a is formed such that one end 124b of the descending mirror 124 may be placed thereon. The second projection 161b facing the first projection 161a is formed to apply pressure onto the mirror 124 in a descending direction. The second projection 161b may be shorter by a predetermined length than the first projection 161a. Thus, the end 124b of the mirror 124 can be placed on the first projection 161a without interruption or interference of the second projection 161b while the mirror 124 moves downward.

The first elastic unit 165 applies predetermined elastic force onto the first guide unit 161 while being engaged with the first guide unit 161. In detail, the first elastic unit 165 may be a general torsion spring. Both first and second ends 165a and 165b of the first elastic unit 165 may be bent into a ring shape. Thus, the first end 165a is engaged with one end of the first guide unit 161, and preferably, with an end of the first guide unit 161 other than the "U" shaped end thereof. The second end 165b may be engaged with the mirror box 120b. Thus, a winding unit 165c of the first elastic unit 165 is a free end, the location of which can vary according to the locations of the first and second ends 165a and 165b.

The second guide unit 171 is disposed in the path of revolution of the mirror 124 to reduce vibration of the mirror 124 when the mirror 124 revolves. In detail, the second guide unit 171 is installed inside the body of the DSLR camera 100 to revolve with respect to a second shaft 173. One end of the second guide unit 171 is formed such that the end 124b of the descending mirror 124 can be placed thereon.

The second elastic unit 175 applies predetermined elastic force onto the second guide unit 171 while being engaged with the second guide unit 171. In detail, the second elastic unit 175 may be a general torsion spring. A winding unit of the second elastic unit 175 is engaged with the second shaft 173. Thus, the location of the second elastic unit 175 cannot be changed, and simply applies the predetermined elastic force onto the second guide unit 171.

A stopper 181 that limits the radius of revolution of the second guide unit 171 may further be disposed toward one end of the second guide unit 171 so that the second guide unit 171 can revolve only within a predetermined angular range, by means of the elastic force given from the second elastic unit 175.

The structure of an image processing device of a DSLR camera according to an embodiment of the present invention will now be described in greater detail.

FIGS. 7A through 7E are views sequentially illustrating an example of a method of operating a DSLR camera according to an embodiment of the present invention.

Figure 7A:
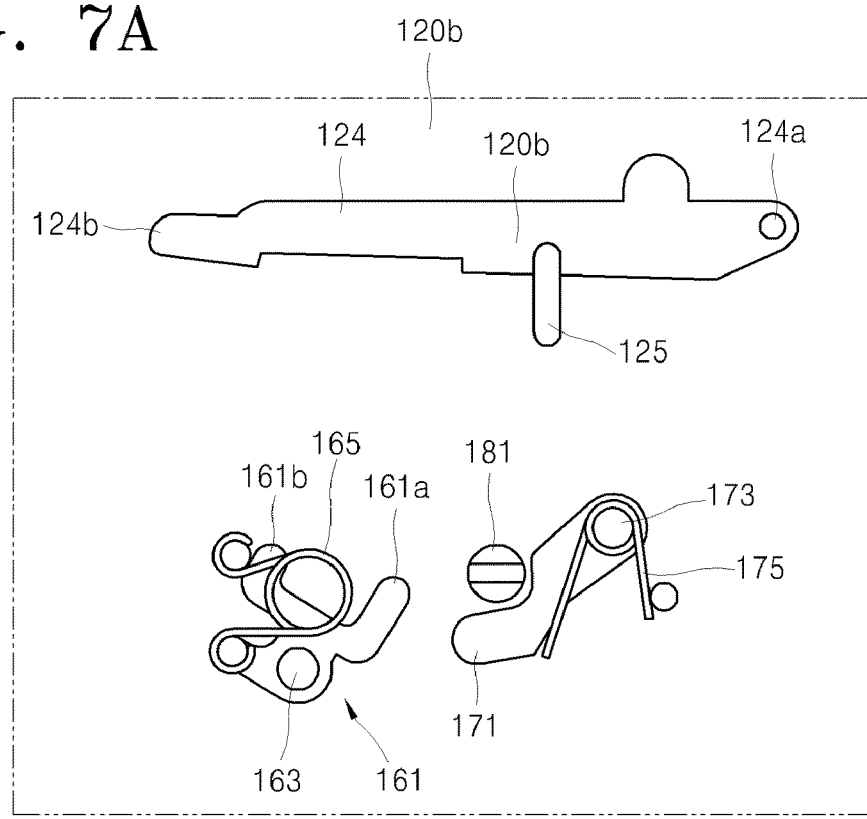
FIGS. 7A through 7E are a series of views sequentially illustrating an example of a method of operating an image processing device of a DSLR camera.

FIG. 7A illustrates a moment that imaging is performed in response to a second shutter-release signal input from a user. That is, when the user inputs the second shutter-release signal, a mirror 124 is driven to move upward in order to retreat from an optical axis of the lens unit 120 of FIG. 3 under control of the mirror driving circuit 137 of FIG. 3, the shutter 126 of FIG. 3 is driven to be open under control of the shutter driving circuit 139 of FIG. 3, and thus an image of a subject is formed on the imaging device 127 of FIG. 3. That is, FIG. 7A illustrates the mirror 124 when in the retracted state, that is, when it is moved upward in order to retreat from the optical axis of the lens unit 120.

Figure 7B:
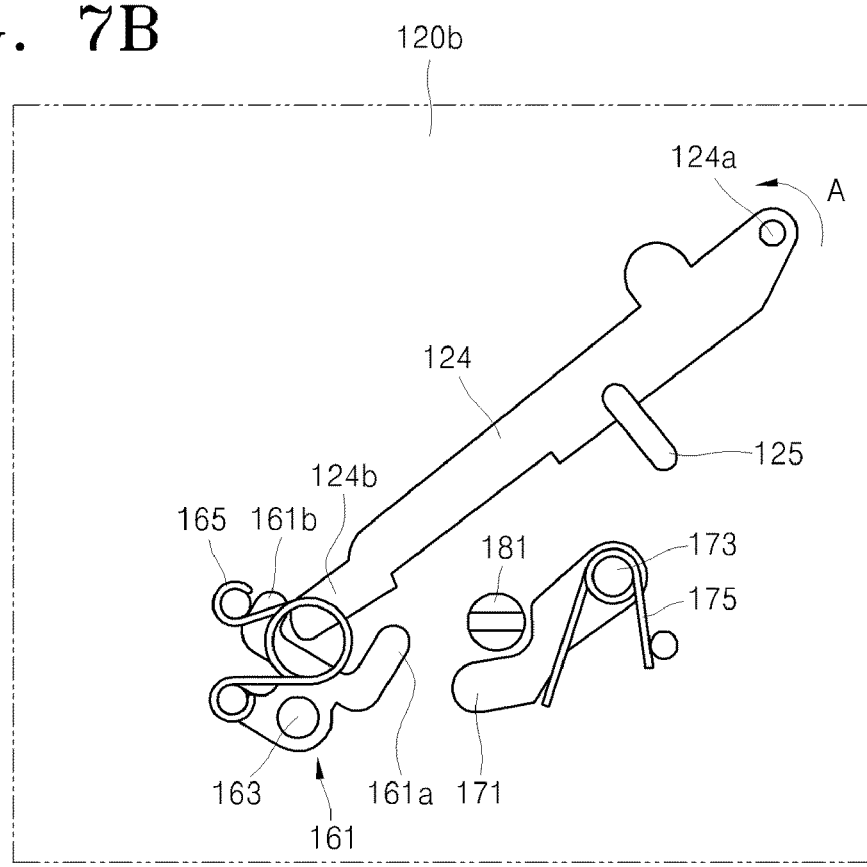

FIG. 7B illustrates the moment at which, after photographing, the mirror 124 moves downward to return to the original position. The mirror 124 begins to move downward while revolving with respect to a shaft 124a in the direction of an arrow A. Referring to FIG. 7B, the mirror 124 has yet to contact the first guide unit 161 and the second guide unit 171, and thus, no elastic force is applied by the first elastic unit 165 and the second elastic unit 175. As described above, the second projection 161b of the first guide unit 161 is shorter by the predetermined length than the first projection 161a, and thus, the end 124b of the mirror 124 can continuously revolve without interference of the second projection 161b while the mirror 124 moves downward.

Figure 7C:
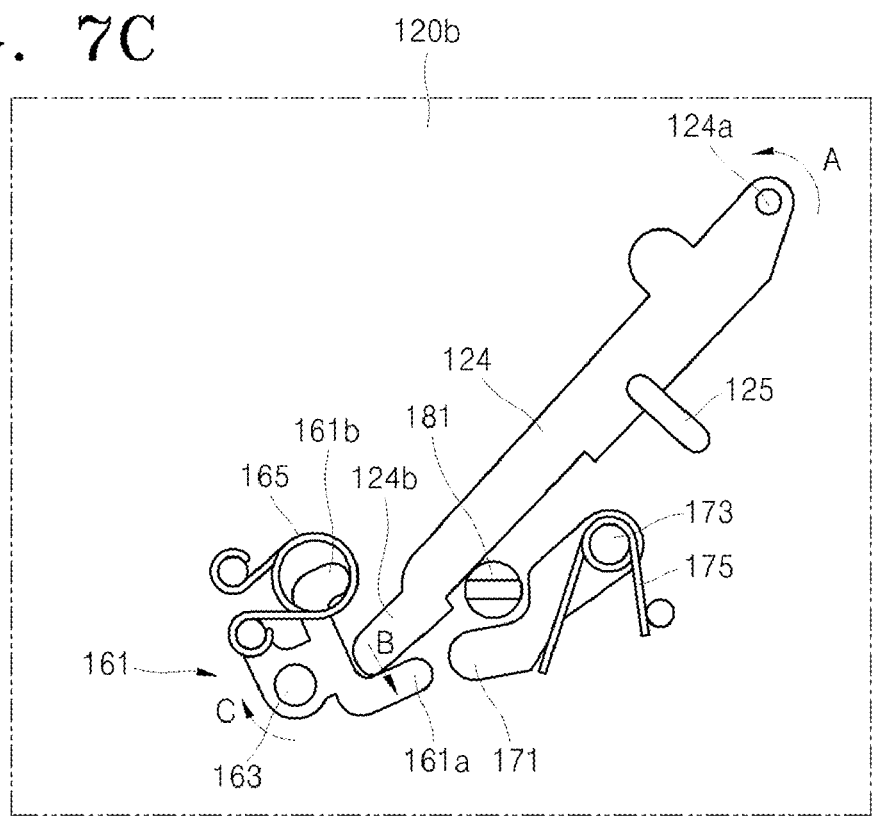

FIG. 7C illustrates the moment at which the mirror 124 has continued to move downward, and thus the end 124b of the mirror 124 contacts the first projection 161a of the first guide unit 161. Specifically, even after contacting the first projection 161a of the first guide unit 161, the mirror 124 continues to revolve in the direction of the arrow A because of inertia. Thus, the mirror 124 applies pressure onto the first guide unit 161 in the direction of an arrow B, and as a result, the first guide unit 161 is given a force revolving in the direction of an arrow C. Then the first elastic unit 165 is given a force that makes both ends thereof approach each other and thus rebounds to return to the original position so that both ends retreat from each other. Accordingly, the first elastic unit 165 applies an elastic force onto the first guide unit 161 so as to revolve the first guide unit 161 in the direction opposite to the direction of the arrow C, and the first guide unit 161 applies pressure onto the mirror 124 in the direction opposite to the direction of revolution of the mirror 124.

As a result, the first elastic unit 165 applies the elastic force onto the first guide unit 161 so that the descending speed of the mirror 124 is reduced. Accordingly, the descending speed of the mirror 124 decreases.

Figure 7D:
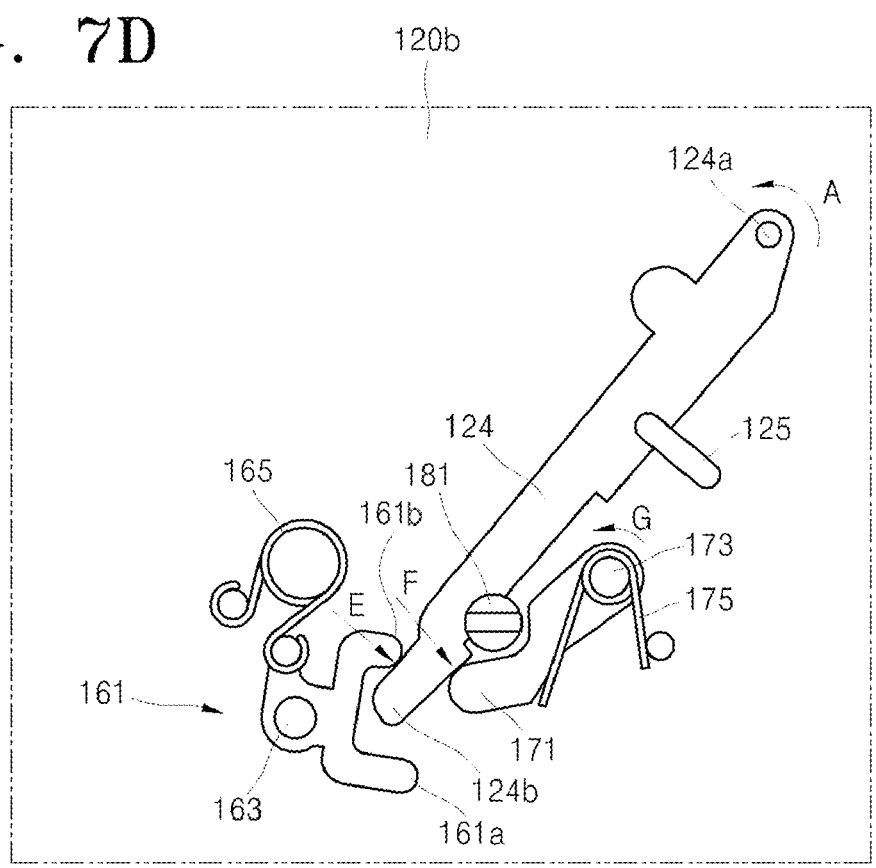

FIG. 7D illustrates the moment at which the mirror 124 has kept moving downward thus causing the first elastic unit 165 to elastically deform up to a predetermined threshold level and to change the direction of the elastic force applied by the first elastic unit 165, so that the first elastic unit 165 can apply predetermined elastic force onto the first guide unit 161, thereby allowing the projection 161b of the first guide unit 161 to apply pressure onto the mirror 124 in the direction of revolution of the mirror 124.

More specifically, as generally seen from movement of a torsion spring included in a slide opening and shutting mechanism of a slide type cellular phone, the moment at which the first elastic unit 165 succumbs to predetermined force, a central axis (winding unit) of the first elastic unit 165 moves thus reversing the direction in which the elastic force is applied. That is, referring to the state illustrated in FIG. 7C, if the mirror 124 continues to apply force onto the first guide unit 161 such that the first elastic unit 165 is applied a force such that both ends thereof approach each other, the first elastic unit 165 elastically deforms until a predetermined threshold level. Then the central axis (winding unit) of the first elastic unit 165 momentarily moves from as illustrated in FIG. 7C to as illustrated in FIG. 7D. Thus, the first elastic unit 165 begins to apply an elastic force such that both ends thereof retreat from each other, and therefore, the second projection 161b of the first guide unit 161 applies pressure onto the mirror 124 in the direction of an arrow E.

If the first guide unit 161 applies pressure onto the mirror 124 in the direction of the arrow E, the mirror 124 contacts the second guide unit 171. In this case, the mirror 124 applies pressure onto the second guide unit 171 in the direction of an arrow F, a force revolving in the direction of an arrow G is applied to the second guide unit 171 and then the second elastic unit 175 rebounds to return to the original position. Accordingly, the second elastic unit 175 applies an elastic force onto the second guide unit 171 so that the second guide unit 171 can revolve in the direction opposite to the direction of the arrow G and the second guide unit 171 applies pressure onto the mirror 124 in the direction opposite to the direction of the revolution of the mirror 124. That is, the second elastic unit 175 applies an elastic force onto the second guide unit 171 in order to reduce the descending speed of the mirror 124.

In this case, the stopper 181 limits the radius of revolution of the second guide unit 171 in order that the second guide unit 171 can revolve only within a predetermined range in the direction opposite to the direction of the arrow G.

Figure 7E:
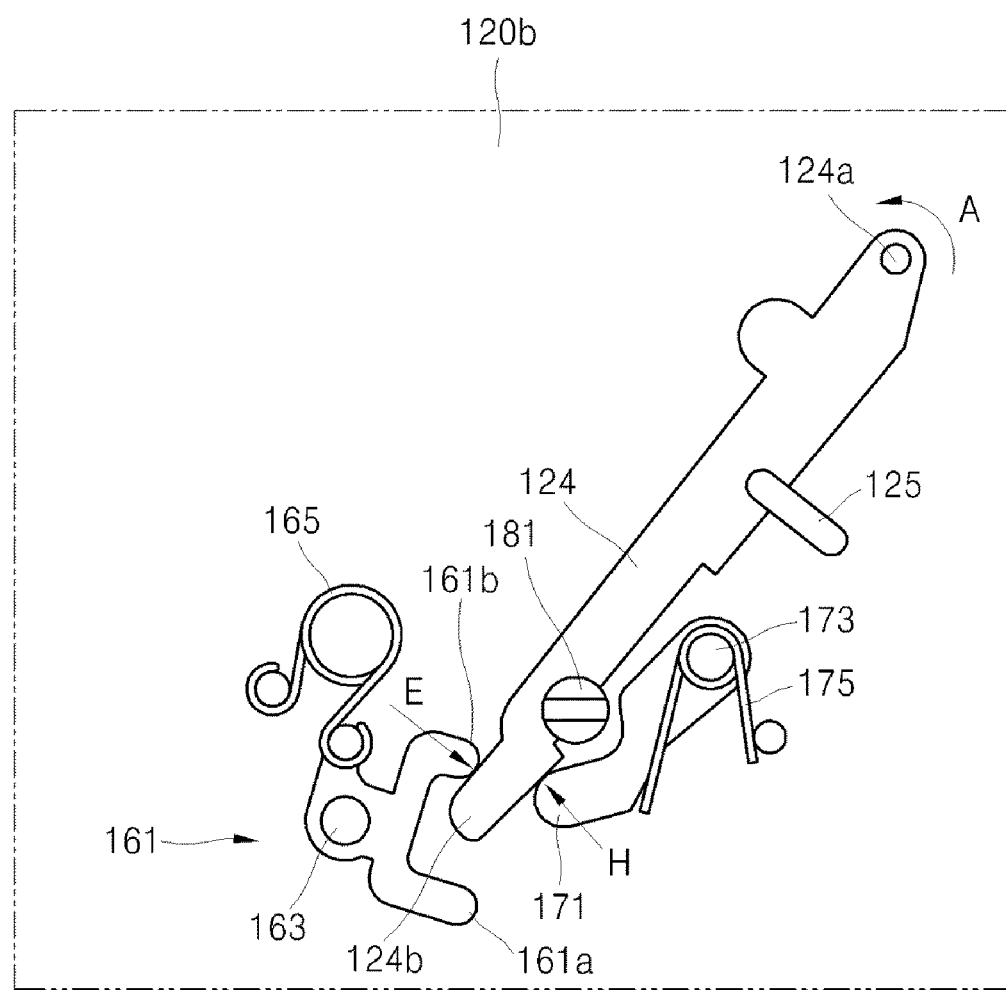

FIG. 7E illustrates a state in which movement of the mirror 124 is stopped due to elastic forces applied in different directions by the first elastic unit 165 and the second elastic unit 175. That is, as described above, the first guide unit 161 pushes the mirror 124 in the direction of the arrow E due to the elastic force applied by the first elastic unit 165. At the same time, the second guide unit 171 pushes out the mirror 124 in the direction of an arrow H due to the elastic force applied by the second elastic unit 175. That is, as a result, the first elastic unit 165 and the second elastic unit 175 provide the mirror 124 with actual forces in opposite directions, thereby rapidly stopping the descending mirror 124.

Accordingly, according to the above embodiments of the present invention, it is possible to increase the operating speed of a camera by reducing mirror bounce.

While this invention has been particularly shown and described with reference to exemplary embodiments thereof, it will be understood by those skilled in the art that various changes in form and details may be made therein without departing from the spirit and scope of the invention as defined by the appended claims. The above exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An image processing apparatus comprising:
   a mirror installed to revolve with respect to a shaft;
   a first guide unit disposed in a path of revolution of the mirror to lessen vibration of the mirror when the mirror revolves; and
   a first elastic unit configured to apply a predetermined elastic force onto the first guide unit while being engaged with the first guide unit, wherein the first elastic unit is configured to apply the predetermined elastic force onto the first guide unit in one direction before pressure applied onto the first elastic unit reaches a predetermined threshold level, and configured to apply the predetermined elastic force onto the first guide unit in a direction which is substantially opposite to the direction when the pressure applied surpasses the predetermined threshold level.

2. The apparatus of claim 1, wherein, when the mirror revolves and one end of the mirror presses against the first guide unit, the first elastic unit is configured to apply the predetermined elastic force on the first guide unit in order to allow the first guide unit to press against the mirror in a direction substantially opposite to a direction of the revolution of the mirror, before the pressure applied onto the first elastic unit reaches the predetermined threshold level.

3. The apparatus of claim 1, wherein, when the mirror revolves and one end of the mirror presses the first guide unit, the first elastic unit is configured to apply the predetermined elastic force on the first guide unit in order to allow the first guide unit to press against the mirror in a direction of the revolution of the mirror, after the pressure applied onto the first elastic unit surpasses the predetermined threshold level.

4. The apparatus of claim 1, wherein the elastic unit comprises a torsion spring.

5. The apparatus of claim 4, wherein, when the mirror revolves and one end of the mirror presses against the first guide unit, the torsion spring is configured to apply the predetermined elastic force on the first guide unit in order to allow the first guide unit to press against the mirror in a direction substantially opposite to a direction of the revolution of the mirror, before the pressure applied to the torsion spring reaches a predetermined threshold level.

6. The apparatus of claim 4, wherein, when the pressure applied to the torsion spring surpasses the predetermined threshold level while the mirror revolves and one end of the mirror presses against the first guide unit, the elastic force is configured to act to separate both ends of the torsion spring from each other and thus the first guide unit presses against the mirror in a direction of revolution of the mirror.

7. The apparatus of claim 1, wherein the first guide unit comprises:

a first projection formed such that the mirror is to be placed on the first projection; and a second projection formed to face the first projection in order to press against the mirror.

8. The apparatus of claim 7, wherein, when the mirror revolves and one end of the mirror presses against the first projection, the first elastic unit is configured to apply the predetermined elastic force on the first projection in order to allow the first projection to press against the mirror in a direction opposite to a direction of the revolution of the mirror, before the pressure applied onto the first elastic unit reaches the predetermined threshold level.

9. The apparatus of claim 7, wherein, when the mirror revolves and one end of the mirror presses against the first projection, the first elastic unit is configured to apply the predetermined elastic force on the second projection in order to allow the second projection to press against the mirror in a direction of the revolution of the mirror, after the pressure applied onto the first elastic unit has surpassed the predetermined threshold level.

10. The apparatus of claim 1, further comprising:
a second guide unit disposed in the path of revolution of the mirror configured to lessen vibration of the mirror when the mirror revolves; and
a second elastic unit configured to apply a predetermined elastic force on the second guide unit while being engaged with the second guide unit.

11. The apparatus of claim 10, wherein, when the mirror revolves and one end of the mirror presses against the second guide unit, the second elastic unit is configured to apply a predetermined elastic force on the second guide unit in order to allow the second guide unit to press against the mirror in a direction substantially opposite to the direction of revolution of the mirror.

12. The apparatus of claim 10, further comprising a stopper preventing the second guide unit from excessively revolving.

13. The apparatus of claim 10, wherein the first guide unit and the second guide unit are configured to substantially press against the mirror in opposite directions.

14. The apparatus of claim 10, wherein the first elastic unit and the second elastic unit are configured to substantially apply forces onto the mirror in opposite directions of each other in order to lessen vibration of the mirror when the mirror revolves.

15. A photographing apparatus comprising:
a mirror installed to revolve with respect to a shaft;
a first guide unit disposed in a path of revolution of the mirror to lessen vibration of the mirror when the mirror revolves;

a first elastic unit configured to apply a predetermined elastic force onto the first guide unit while being engaged with the first guide unit, wherein the first elastic unit is configured to apply the predetermined elastic force onto the first guide unit in one direction before pressure applied onto the first elastic unit reaches a predetermined threshold level, and configured to apply the predetermined elastic force onto the first guide unit in a direction which is substantially opposite to the direction when the pressure applied surpasses the predetermined threshold level;

a lens on which light is incident;

an imaging device configured to convert energy of the incident light into an electrical signal;

a display unit configured to display an image captured by the imaging device; and a mirror configured to change a direction of propagation of the incident light.

16. A method of photographing an image by using an imaging apparatus having an image processing device, the method comprising:
(a) moving a mirror downward while revolving in a first direction;
(b) when the mirror contacts a first guide unit and pushes the first guide unit in the first direction, applying, via a first elastic unit, a predetermined elastic force onto the first guide unit in order to allow the first guide unit to push the mirror in a direction opposite to the first direction; and
(c) when the first elastic unit elastically deforms to a predetermined threshold level, applying, via the first elastic unit, a predetermined elastic force onto the first guide unit in order to allow the first guide unit to push the mirror in the first direction.

17. The method of claim 16, further comprising (d) when the mirror contacts a second guide unit and pushes the second guide unit in the first direction, applying, via a second elastic unit, a predetermined elastic force onto the second guide unit in order to allow the second guide unit to push the mirror in the direction opposite to the first direction.

18. The method of claim 17, wherein the first guide unit and the second guide unit press against the mirror in substantially opposite directions.

19. The method of claim 17, wherein the first elastic unit and the second elastic unit apply forces onto the mirror in substantially opposite directions in order to lessen vibration of the mirror when the mirror revolves.

* * * * *